United States Patent
Cornwall

(10) Patent No.: US 6,637,464 B1
(45) Date of Patent: Oct. 28, 2003

(54) HYDROSTATIC TEST CAP

(76) Inventor: Kenneth R. Cornwall, 1020 Vintage Club Dr., Duluth, GA (US) 30097

( * ) Notice: Subject to any disclaimer, the term of this patent is extended or adjusted under 35 U.S.C. 154(b) by 0 days.

(21) Appl. No.: 10/232,147

(22) Filed: Aug. 30, 2002

(51) Int. Cl.[7] ............................................... F16L 55/10
(52) U.S. Cl. ......................... 138/90; 138/96 R; 138/89; 4/286
(58) Field of Search ...................... 138/96 R, 96 T, 138/89, 90; 4/286

(56) References Cited

U.S. PATENT DOCUMENTS

| | | | |
|---|---|---|---|
| 2,596,182 A | | 5/1952 | Sosaya ...................... 138/89 X |
| 4,146,939 A | * | 4/1979 | Izzi ................................. 4/286 |
| 4,261,598 A | * | 4/1981 | Cornwall ..................... 285/56 |
| 4,823,411 A | * | 4/1989 | Nettel ......................... 4/256.1 |
| 4,827,539 A | * | 5/1989 | Kiziah .......................... 4/252.4 |
| 5,377,361 A | | 1/1995 | Piskula ..................... 138/90 X |

* cited by examiner

Primary Examiner—Patrick Brinson
(74) Attorney, Agent, or Firm—Mary M. Moyne; Ian C. McLeod

(57) ABSTRACT

A test cap (10) for use with a building drain (102) to allow hydrostatic testing of the building drain. The test cap includes an end wall (12) with a sidewall (14) extending around the perimeter of the end wall. The top side (12A) of the end wall is provided with an annular groove (16) which surrounds a center portion (18) of the test cap. The diameter of the groove is such that a standard sized pipe (104) can be used to apply force to the groove to detach the center portion from the end wall of the test cap. Once hydrostatic testing is complete, the center portion is detached from the end wall of the test cap and removed to allow access to the building drain.

16 Claims, 3 Drawing Sheets

HYDROSTATIC TEST CAP

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION (1) Field of the Invention

The present invention relates to a test cap for use in hydrostatic testing of building drains. In particular, the present invention relates to a test cap for use in hydrostatic testing which has a detachable center portion which is easily removed.

(2) Description of the Related Art

The related art has shown various closet flanges having knock-out portions for use in hydrostatic testing. Illustrative are U.S. Pat. Nos. 2,596,182 to Sosava and U.S. Pat. No. 5,377,361 to Piskula.

Sosava describes a closet flange with a knock-out test plug. The closet flange includes a cylindrical collar with an external flange at one end. A thin end wall continuous with the external flange extends across the end of the collar. The end wall is provided with grooves in its outer and inner surfaces to provide a circular knock-out test plug. The grooves have a diameter substantially equal to the inside diameter of the waste pipe elbow which is received in the flange collar. The test plug is knocked out by striking the test plug with a hammer.

Piskula describes a toilet flange having an integral knock-out element. The knock-out element is connected to the remainder of the toilet flange by an annular web. The knock-out element is removed either by cutting it out or knocking it out using a hammer. The diameter of the knock-out element when removed is larger than the diameter of the lumen of the lower body portion.

There remains the need for a hydrostatic test cap which has a knock-out section which is knocked out using a standard 3 inch or 4 inch Iron Pipe Size (IPS) pipe.

SUMMARY OF THE INVENTION

A test cap for use with a building drain to allow hydrostatic testing of the building drain. The test cap is mounted over an open end of a drain pipe or coupling of the building drain and closes the end to seal the open end to prevent fluids from escaping the drain through the open end during hydrostatic testing. The test cap can be used during initial installation of the building drain. Once hydrostatic testing is complete, the center portion of the test cap is detached and removed allowing access to the building drain. The remainder of the test cap remains mounted on the end of the coupling or drain pipe of the building drain.

The test cap includes an end wall with a sidewall extending out from the end wall around the perimeter of the end wall. The top side of the end wall is provided with an annular groove which surrounds and defines the center portion of the test cap. The test cap is mounted on the end of the drain pipe or coupling of the building drain such that the inner side of the end wall is adjacent to the end of the drain pipe or coupling and the groove is on the top side opposite the end.

In one (1) embodiment, the test cap is mounted on the end such that the inner side of the end wall of the test cap is spaced apart from the end of the drain pipe or coupling of the building drain.

The diameter and width of the annular groove is such that a standard sized pipe such as a PVC pipe or an IPS pipe can be used to apply force to the groove to detach the center portion from the end wall of the test cap. In one (1) embodiment, the center bore of the coupling or drain pipe has a tapered section adjacent the open end and the test cap. Thus, the diameter of the center bore adjacent the open end is greater than the diameter of the center bore at the end of the tapered section spaced apart from the open end.

After testing, to detach the center portion, a force is applied to the annular groove. The force can be applied by a standard PVC or IPS pipe. When the center portion is detached, the center portion falls inward toward the center bore of the coupling or drain pipe. In one (1) embodiment the diameter of the center bore is such that the center portion can not enter the center bore.

In another embodiment where the center bore of the coupling or drain pipe has a tapered portion, the diameter of the center portion is such that the center bore can not move beyond the end of the tapered portion having the smaller diameter spaced apart from the open end of the coupling or drain pipe. To remove the detached center portion, a side of the center portion is pushed to pivot or tilt the center portion such that one section moves upward and can be grasped by the user. Once the detached center portion is removed, a plumbing fixture or other drain part can be connected through the opening in the test cap to the center bore of the drain pipe or coupling.

The present invention relates to a coupling assembly for use in hydrostatic testing of a building drain, which comprises: a coupling having a first end and a second end with a center bore extending between the ends and configured to be connected to the building drain at the second end; and a test cap having a first side and a second side and mounted on the first end of the coupling such that the second side of the test cap is adjacent to and spaced apart from the first end of the coupling such as to close the center bore of the coupling at the first end of the coupling, the first side of the test cap having an annular groove forming a center portion wherein the groove provides a weakened area on the first side such that in use, after the hydrostatic testing of the building drain is complete, the center portion of the test cap is detached from the test cap at the groove to provide an opening through the test cap to allow access to the center bore of the coupling.

Further, the present invention relates to a test cap for mounting on a drain pipe for use in hydrostatic testing of a building drain, which comprises: an end wall having a circular shape with an edge around a circumference of the end wall and having a first side and a second side; an annular groove formed in the first side of the end wall and spaced apart from the edge of the end wall; a center portion having a circular shape and formed in the end wall by the groove on a side of the groove opposite the edge of the end wall; and a sidewall mounted on the edge of the end wall on the second side of the end wall and extending outward in a direction away from the first side of the end wall and configured to accommodate an end of the drain pipe of the building drain.

Still further, the present invention relates to a method for hydrostatic testing of a building drain which comprises the steps of: providing a test cap having an end wall having a first side and a second side with a groove on the first side forming a center portion; mounting the test cap on an open end of the building drain; performing a hydrostatic test on the building drain; detaching the center portion from the test cap by applying a force to the groove on the first side of the test cap which detaches the center portion from the remainder of the test cap at the groove such that the center portion drops into the open end of the building drain; and removing the center portion from the center bore of the coupling by grabbing the center portion and moving the center portion through an opening in the test cap formed by the detachment of the center portion.

The substance and advantages of the present invention will become increasingly apparent by reference to the following drawings and the description.

DESCRIPTION OF THE PREFERRED EMBODIMENTS

Figure 1:
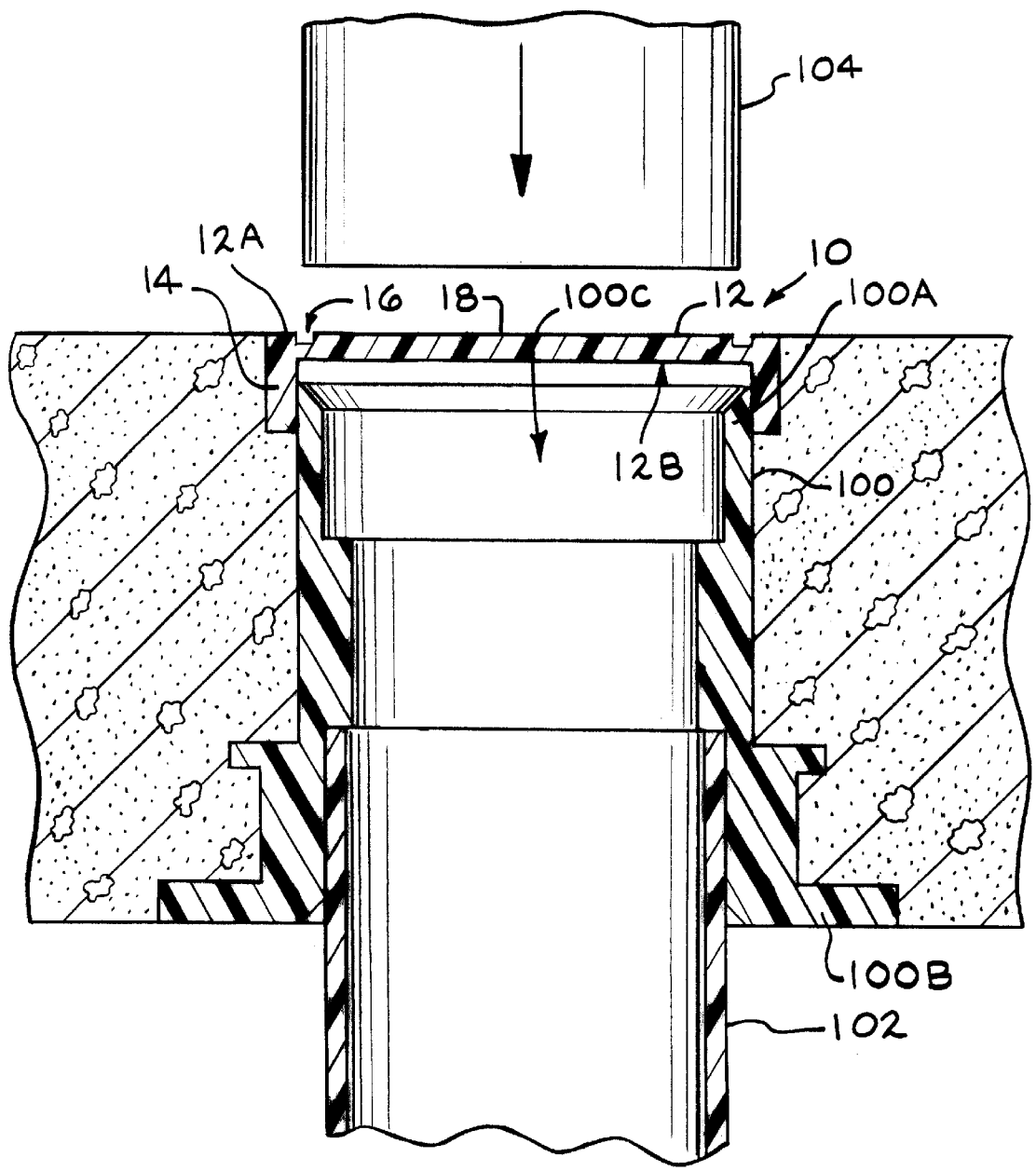
FIG. 1 is a cross-sectional view showing the test cap 10, the coupling 100 and the standard IPS pipe 104.
Figure 2:
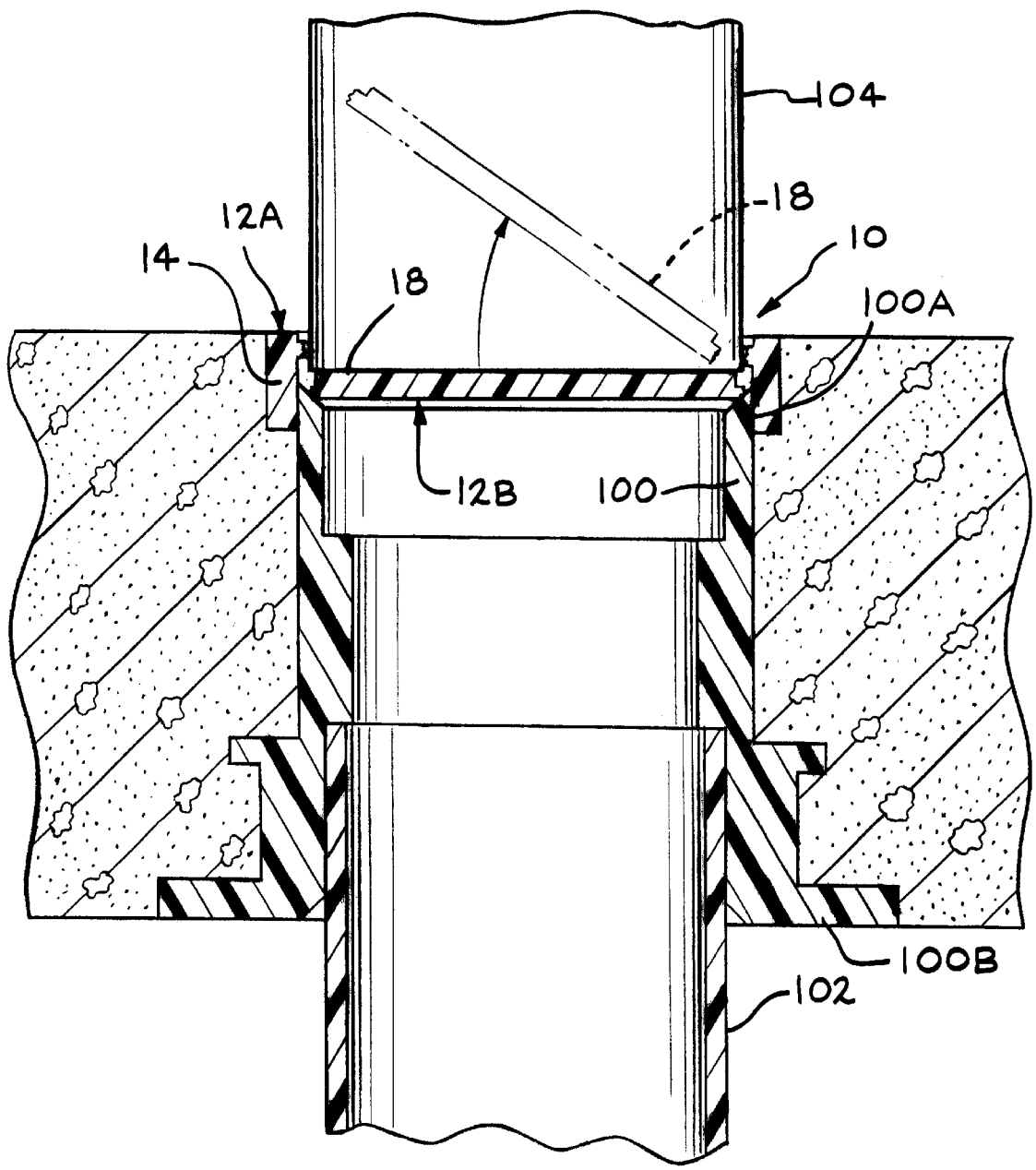
FIG. 2 is a cross-sectional view of the test cap 10 on the coupling 100 with the center portion 18 detached.
Figure 3:
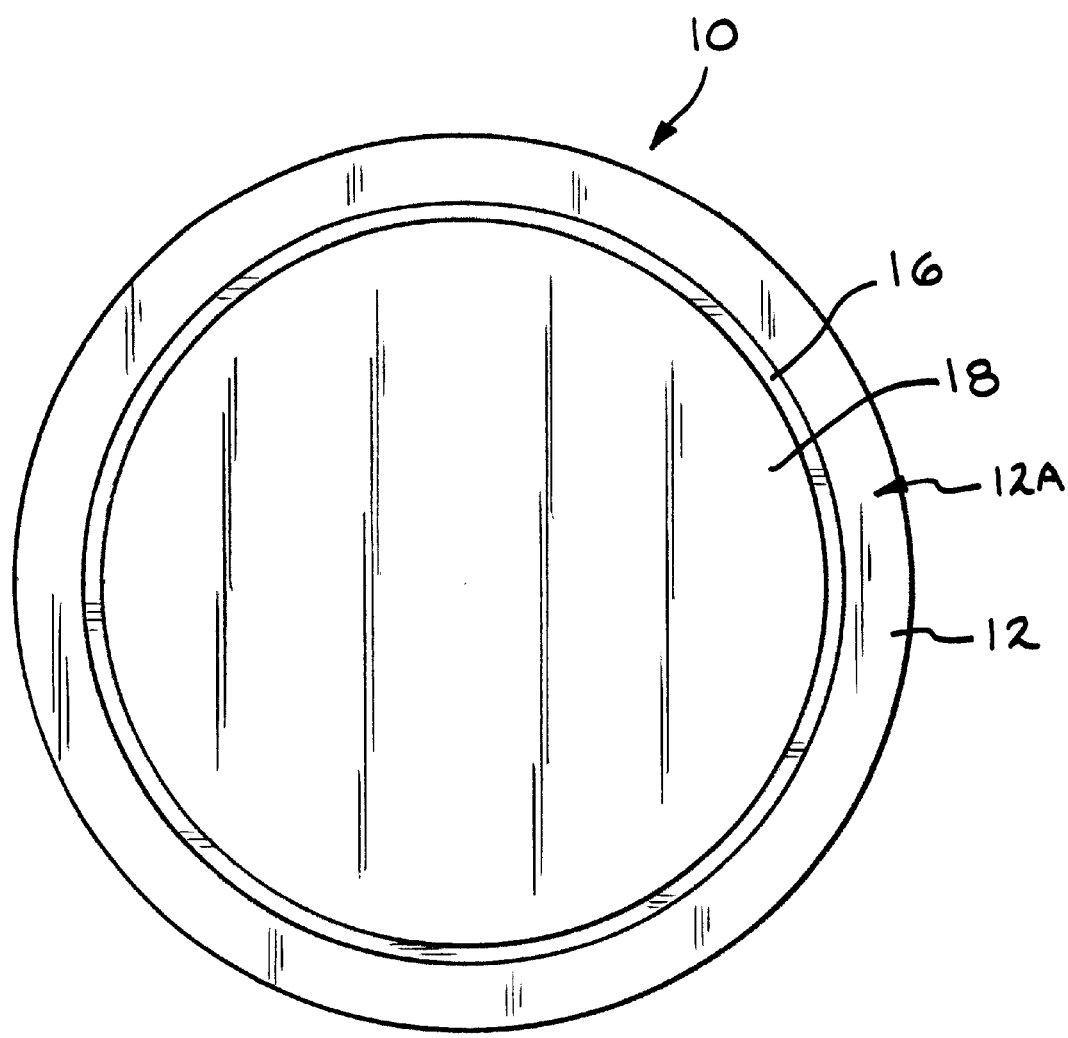
FIG. 3 is a top view of the test cap 10.

FIGS. 1 to 3 show the hydrostatic test cap 10 of the present invention mounted on a coupling 100. The test cap 10 is intended to be mounted on the end 100A of a coupling 100 or drain pipe (not shown) connected to a building drain 102. The test cap 10 includes a circular end wall 12 with a sidewall 14 extending outward perpendicular to the end wall 12 around the entire edge or perimeter of the end wall 12. The inner diameter of the sidewall 14 is slightly greater than the outer diameter of the coupling 100 or drain pipe on which the test cap 10 is mounted so that the test cap 10 can be easily fit on the end 100A of the coupling 100 or drain pipe and such that the inner surface of the sidewall 14 can be secured to the outer surface of the coupling 100 or drain pipe such as by solvent welding. The sidewall 14 has a length such that the inner side 12B of the end wall 12 can be spaced apart from the end 100A of the coupling 100 or drain pipe while still enabling the sidewall 14 to be secured to the coupling 100 or drain pipe. The end wall 12 has a first or top side 12A and a second or inner side 12B. The top side 12A of the end wall 12 is provided with an annular groove 16 which forms or surrounds the center portion 18 or knock-out portion of the test cap 10. The groove 16 provides a thin or weakened section in the end wall 12 of the test cap 10. The diameter of the groove 16 depends on the diameter of center bore 100C of the coupling 100 or drain pipe to which the test cap 10 is mounted. In one (1) embodiment, the diameter of the groove 16 is substantially similar to the diameter of a standard IPS or PVC pipe 104. For example, the groove 16 could have a diameter of 3.5 inch (8.9 cm) which corresponds to a standard 3 inch PVC or IPS pipe 104 or a diameter of 4.5 inch (11.4 cm) which corresponds to a standard 4 inch PVC or IPS pipe 104. The groove 16 preferably has a width at least equal to a width of a standard drain pipe 104 such that a standard IPS or PVC pipe 104 can easily fit in the groove 16. In one (1) embodiment where the standard pipe 104 is constructed of PVC, the groove 16 has a width of approximately 0.25 inch (0.64 cm). The thickness of the groove 16 is such that the center portion 18 will not become detached from the end wall 12 during hydrostatic testing but can be easily and quickly detached by an ordinary user. In one (1) embodiment, the test cap 10 is constructed of PVC; however, it is understood that the test cap 10 could be made of any well known material.

In one (1) embodiment, the center bore 100C of the coupling 100 or drain pipe at the end adjacent the test cap 10 is angled or tapered such that the diameter of the center bore 100C at the end 100A of the coupling 100 or drain pipe is greater than the diameter of the center bore 100C at the end of the tapered portion spaced inward from the end 100A of the coupling 100 or drain pipe.

The test cap 10 is intended to be used at the inlet or outlet of a building drain 102 to block the inlet or outlet to allow hydrostatic testing of the building drain 102. In one (1) embodiment, the test cap 10 is used during the installation of the building drain 102. The test cap 10 also prevents debris from entering the coupling 100 or drain pipe during installation. The test cap 10 is intended to be secured to the end 100A of a coupling 100 or drain pipe with the other end 100B of the coupling 100 or drain pipe connected to the remainder of the building drain 102. The test cap 10 is mounted over the open end 100A of the coupling 100 or drain pipe such that the inner surface of the sidewall 14 is adjacent and in contact with the outer surface of the coupling 100 or drain pipe. In one (1) embodiment, the test cap 10 is mounted on the end 100A of the coupling 100 or drain pipe such that the inner surface 100B of the end wall 12 is spaced apart from the coupling 100. In one (1) embodiment, the test cap 10 is mounted on the coupling 100 and then the coupling 100 is secured in concrete by pouring concrete around the coupling 100. In this embodiment, the test cap 10 is permanently fixed to the coupling 100 and prevents concrete from entering the center bore 100C of the coupling 100 during installation.

While the hydrostatic test is being performed on the building drain 102 having the test cap 10, the test cap 10 remains securely in place and prevents fluids from exiting the end 10A of the coupling 100 or drain pipe. Once testing has been completed, the center portion 18 of the test cap 10 is detached or removed such that the end 100A of the coupling 100 or pipe can be used for mounting a plumbing fixture (not shown) or for connection to another section of the building drain 102.

To detach and remove the center portion 18 from the end wall 12, a force is applied to the annular groove 16 in the top side 12A of the end wall 12. In one (1) embodiment, the force is applied around the entire circumference of the groove 16. In one (1) embodiment, a standard PVC or IPS pipe 104 or conduit is used to apply the force to the groove 16. In this embodiment, the diameter of the annular groove 16 is substantially similar to the diameter of the standard PVC pipe. To detach the center portion 18, one (1) end of the standard drain pipe 104 is placed in the annular groove 16. Once the end of the standard PVC or IPS pipe 104 is in the groove 16, a force is applied to the opposite end (not shown) of the standard drain pipe 104 which transfers the force to the groove 16 and detaches the center portion 18. In another embodiment, the standard PVC or IPS pipe 104 is pushed into the groove 16 in one (1) movement with the force necessary to detach the center portion 18 from the end wall 12 by breaking the end wall 12 along the entire circumference of the groove 16. When the center portion 18 is initially detached, the center portion 18 moves towards and falls into the center bore 100C of the coupling 100 or drain pipe. The end 100A of the standard PVC or IPS pipe 104 used to apply the force also moves toward the center bore 100C of the coupling 100. In one (1) embodiment, the spacing of the end wall 12 of the test cap 10 from the end 100A of the coupling 100 or drain pipe allows the end of the standard PVC or IPS pipe 104 to move past the end wall 12 of the test cap 10 a short distance before encountering the end 100A of the coupling 100 or drain pipe. Thus, there is less chance of damage to the coupling 100 or drain pipe from contact with the standard PVC or IPS pipe 104. In the one (1) embodiment where the center bore 100C of the coupling 100 or drain pipe is tapered, the center portion 18 has a diameter such as to be able to enter the tapered portion of the center bore 100C but such as to stop at the end of the tapered portion of the center bore 100C spaced inward of the end 100A of the coupling 100 or drain pipe. Once the center portion 18 is detached, the standard PVC or IPS pipe 104 is removed and the center portion 18 is removed from the center bore 100C of the coupling 100. The center portion 18 is removed by pushing on one (1) side of the detached center portion 18 which tilts or pivots the center portion 18 in the center bore 100C of the coupling 100 or drain pipe and moves one (1) section of the center portion 18 upward allowing the center portion 18 to be grasped and removed from the center bore 100C of the coupling 100. With the center portion 18 removed, an opening is provided through the test cap 10 and into the center bore 100C of the coupling 100 or drain pipe. The coupling 100 or drain pipe can then be connected through the opening in the test cap 10 to a plumbing fixture or another section of the building drain 102.

It is intended that the foregoing description be only illustrative of the present invention and that the present invention be limited only by the hereinafter appended claims.

I claim:

1. A coupling assembly for use in hydrostatic testing of a building drain, which comprises:
    (a) a coupling having a first end and a second end with a center bore extending between the ends and configured to be connected to the building drain at the second end, wherein the center bore of the coupling has a tapered portion adjacent the first end of the coupling so that a first diameter of the center bore at the first end of the coupling is greater than a second diameter of the center bore at an end of the tapered portion spaced apart from the first end of the coupling; and
    (b) a test cap having a first side and a second side and mounted on the first end of the coupling such that the second side of the test cap is adjacent to and spaced apart from the first end of the coupling such as to close the center bore of the coupling at the first end of the coupling, the first side of the test cap having an annular groove forming a center portion wherein the second diameter of the center bore of the coupling is less than a diameter of the center portion of the test cap and wherein the groove provides a weakened area on the first side such that in use, after the hydrostatic testing of the building drain is complete, the center portion of the test cap is detached from the test cap at the groove to provide an opening through the test cap to allow access to the center bore of the coupling and moves into the center bore of the coupling and stops at the end of the tapered portion spaced apart from the first end of the coupling to allow for removal of the center portion from the coupling.

2. The assembly of claim 1 wherein the test cap has a sidewall extending outward from the second side and wherein an inner diameter of the sidewall of the test cap is greater than an outer diameter of the coupling at the first end such that the test cap extends over the first end of the coupling adjacent an outer surface of the coupling.

3. The assembly of claim 2 wherein a length of the sidewall enables the sidewall to be secured to the coupling so that the second side of the test cap is spaced apart from the first end of the coupling.

4. The assembly of claim 1 wherein a diameter of the groove is similar to a diameter of a standard PVC or IPS pipe so that the standard pipe can be used to detach the center portion of the test cap.

5. A test cap for mounting on a drain pipe for use in hydrostatic testing of a building drain, which comprises:
    (a) an end wall having a circular shape with an edge around a circumference of the end wall and having a first side and a second side;
    (b) an annular groove formed in the first side of the end wall and spaced apart from the edge of the end wall wherein a width of the annular groove is at least equal to a width of a standard drain pipe;
    (c) a center portion having a circular shape and formed in the end wall by the groove on a side of the groove opposite the edge of the end wall; and
    (d) a sidewall mounted on the edge of the end wall on the second side of the end wall and extending outward in a direction away from the first side of the end wall and configured to accommodate an end of the drain pipe of the building drain.

6. The cap of claim 5 herein a diameter of the center portion is configured to be greater than a diameter of a part of a center bore of the drain pipe of the building drain.

7. The cap of claim 5 wherein a diameter of the groove is similar to a diameter of a standard sized pipe so that the standard sized pipe can be used to detach the center portion of the test cap.

8. The cap of claim 5 wherein a length of the sidewall enables the sidewall to be secured to the drain pipe such that the second side of the end wall is spaced apart from the end of the drain pipe.

9. The cap of claim 5 wherein an outer diameter of the groove is configured to be greater than an inner diameter of a portion of a center bore of the drain pipe of the building drain.

10. A method for hydrostatic testing of a building drain which comprises the steps of:
    (a) providing a test cap having an end wall having a first side and a second side with a groove on the first side forming a center portion;
    (b) mounting the test cap on an open end of the building drain;
    (c) performing a hydrostatic test on the building drain;
    (d) detaching the center portion from the test cap by applying a force to the groove on the first side of the test cap which detaches the center portion from the remainder of the test cap at the groove such that the center portion drops into the open end of the building drain; and
    (e) removing the center portion from the building drain by grabbing the center portion and moving the center portion through an opening in the test cap formed by the detachment of the center portion.

11. The method of claim 10 wherein a coupling is provided having a first end and a second end with a center bore extending between the ends, wherein before step (b), the second end of the coupling is connected to the building drain, and wherein in step (b) the test cap is mounted on the first end of the coupling such that the second side of the end wall of the test cap is adjacent to the first end of the coupling.

12. The method of claim 11 wherein after step (b), the coupling with the test cap is mounted in a partition by pouring concrete around the coupling and the test cap wherein the test cap prevents concrete from entering the center bore of the coupling.

13. The method of claim 11 wherein in step (b), the test cap is mounted on the first end of the coupling so that the second side of the test cap is spaced apart from the first end of the coupling.

14. The method of claim 10 wherein a diameter of the groove is similar to a diameter of a standard pipe and wherein in step (d), the force is applied to the groove using the standard pipe.

15. The method of claim 14 wherein in step (d), when the center portion initially detaches from the end wall of the test cap, the standard sized pipe extends into the open end of the building drain.

16. The method of claim 10 wherein in step (b), the test cap is mounted on the open end of the building drain such that the second side of the test cap is spaced apart from the open end of the building drain.

* * * * *